2,721,063

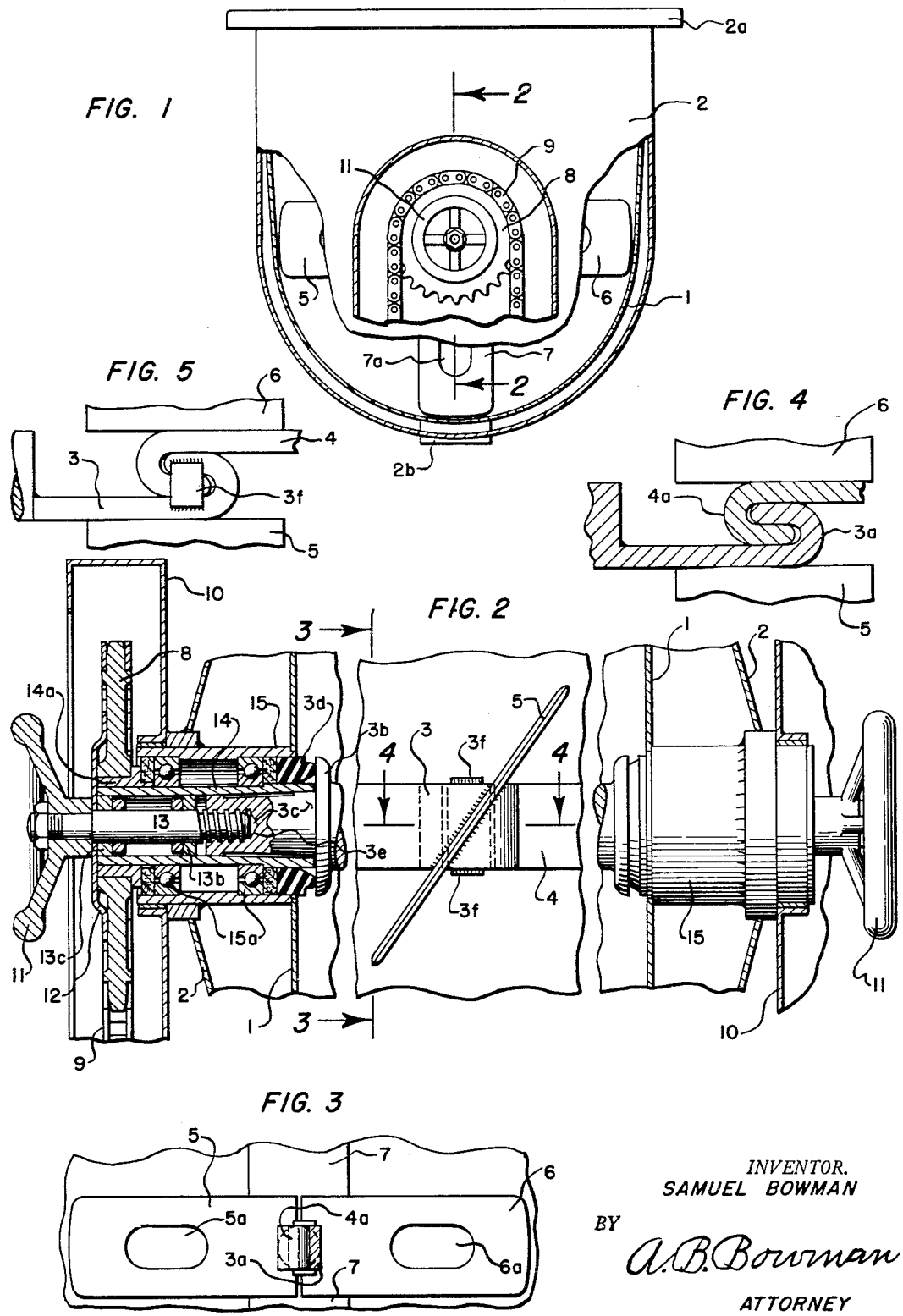

CHEESE MIXER

Samuel Bowman, Glendale, Calif.

Application October 7, 1952, Serial No. 313,562

2 Claims. (Cl. 259—109)

My invention relates to a cheese mixer, more particularly to a machine for mixing cheese which is the cottage cheese or similar type. The objects of my invention are, First, to provide a cheese mixer with mixing blades and bowl so arranged that the cheese is mixed by folding the cheese in layers so as to not break the curds while mixing.

Second, to provide mixing blades with openings to permit limited cheese passage so that the cheese will not pack between the blades.

Third, to provide blades and bowl relation so that substantially all the cheese in the bowl is mixed with no still spots in the bowl.

Fourth, to provide a separable shaft for the blades for an efficient cleaning of the shaft and blades and bowl.

Fifth, to provide efficient sealing of the bowl and shaft to prevent leakage of the cheese from the bowl into the working part of the mixer and shaft.

Sixth, to provide safety means between the driving means and the shaft.

Seventh, to provide cooling means for the cheese while being mixed in the bowl, and Eighth, to provide a cheese mixer of this class which is simple of construction, easy to assemble and disassemble, efficient in its action, provides a smooth folding action on the cheese, and which will not readily deteriorate or get out of order.

With these and other objects in view, as will appear hereinafter, my invention consists of certain novel features of construction, combination, and arrangement of parts and portions, as will be hereinafter described in detail and particularly set forth in the appended claims, reference being had to the accompanying drawings and the characters of reference thereon, which form a part of this application, in which:

Figure 1 is an end elevational view of my cheese mixer showing parts and portions broken away and in sections to facilitate the illustration. Fig. 2 is an enlarged sectional view showing parts in elevation and shown fragmentarily taken from the line 2—2 of Fig. 1. Fig. 3 is a fragmentarily sectional and elevational view taken from the line 3—3 of Fig. 2 shown on a reduced scale, Fig. 4 is an enlarged sectional view of the shaft connection between shaft 3 and 4, taken from a line 4—4 of Fig. 2, and Fig. 5 is a top or plan view of the shaft connection means.

Similar characters of reference refer to similar parts and portions throughout the several views of the drawings.

The bowl 1, bowl water jacket 2, shaft members 3 and 4, paddle members 5, 6 and 7, sprocket 8, drive chain 9, sprocket housing 10, shaft control wheels 11, safety drive key 12, shaft control bolt 13, spindle 14, and bearing housing 15, constitute the principal parts and portions of my cheese mixer.

It will be here noted that the bowl 1, shafts 3 and 4, and paddle members 5, 6 and 7, with which the cheese comes in contact during the mixing operation, are preferably made of stainless steel.

The bowl 1 is substantially a U-shaped receptacle of the proper length to provide for the operation of the various paddles therein, and is open at its normally upper side. It is preferably provided with a flange 2a around its upper side for reinforcing and for a lid support if a lid is desired. This bowl 1 is pivotally mounted on the axis of the shaft members 3 and 4 and the control wheels 11, so that it may be tilted if desired for emptying, cleaning and the like. It is provided in its normally lower side with an opening gate 2b to permit emptying the bowl of cheese from the lower side if desired, said emptying gate being no part of my present invention. The water jacket 2 it will be noted, decreases upwardly toward the upper side of the bowl.

The shaft member 4 is provided on its inner end with an interlocking loop portion 4a which is arranged to interlock with a similar loop portion 3a on the inner end of the shaft member 3. Said inner end portions are reduced and flattened as shown best in Figure 4 of the drawing in their interlocked relation. Welded across the opposite sides of the portion 3a are plates 3f for holding the shafts in alinement shown in Fig. 5; also welded to the shaft portion 3a is the paddle member 5 in angular position as shown in Fig. 2 and extends outwardly to adjacent relation at its end with the inner curved side of the bowl 1 which inner side is concentric with the axis of the shaft members 3 and 4. This paddle member 5 is provided with an oblong opening 5a therein, and secured to the shaft member portion 4a is another similar paddle member 6 with a similar opening 6a. It will be noted that the inner ends of the paddle members 5 and 6 are in alinement with each other and substantially abutting relation at their inner ends as shown best in Fig. 3 of the drawing. Mounted on the shaft members 3 and 4 outwardly from the paddle members 5 and 6 are one or more other paddle members 7 which are welded on the shaft body and their inner ends extend to the middle of the shaft and positioned on one side only. The edges of the paddle members 7 are in substantial alinement with paddle members 5 and 6 at opposite sides and the outer paddle members are arranged so their side edges fit closely to the end walls of the bowl 1 so that with the revolution of the shaft 3 and 4, the inner side of the bowl member 1 from the axes of shaft members 3 and 4 downwardly is wiped clean of the cheese with the revolution of the shaft with the paddle members 5, 6 and 7. It being noted that paddle member 7 is provided with oblong openings 7a substantially the same as the openings 5a and 6a. The outer end of shaft member 3 is provided with a flange member 3b extending outwardly and the shaft is tapered from this flange member 3b to its end 3c. This tapered end is splined engagement with the spindle 14 which is tapered to conform with the taper of the shaft partion 3c, so that when the shaft 3 is in secured relation by reason of the spline, the shaft 3 is revolved with the spindle 14. This spindle member 14 is revolubly mounted in the bearing housing 15 by means of ball bearings 15a. Interposed between the ball bearing 15a and the flange 3b is a rubber gasket 3d which forms a seal between the housing 1, shaft member 3b, and spindle 14. This bearing housing 15 is supported on sprocket housing 10, which forms the support for the outer end for the bearings for shaft 3. This sprocket housing 10 also houses the sprocket 8 which is secured to the spindle 14 by means of an intermediate connecting member 14a so that with the revolution of the sprocket 8 the spindle 14 is revolved carrying with it shaft member 3. This sprocket 8 is operated by sprocket chain 9 which is connected with any source of power for operating the cheese mixer. The tapered portion 3c of the shaft member 3 is provided with an internal bore 3e which is threaded preferably with square threads as shown best in Fig. 2 of the drawings and in which is mounted the control bolt 13 which is provided with collars and supported on bearings 13a and 13b. On the extended end of the bolt 13 is mounted shaft control wheel 11 which extends outwardly of the sprocket housing 10 as shown best in Fig. 2 of the drawing. Positioned between the sprocket 8 and the hub of the wheel 11 is the safety drive key 12 which is the connecting key between the sprocket 8 and the spindle 14, and arranged to yield when the pressure becomes too high, and it is therefore used as a safety key in the operation of the cheese mixer.

It will be here noted that the outer end of the shaft 4 is constructed in the same manner as the shaft member 3 and has the same kind of bolt 13, supports 13b, spindle 14, and bearing housing 15, together with the wheel 11 and housing 10, however the sprocket 8, chain 9, and safety key 12, are omitted.

The operation of the cheese mixer is substantially as follows:

The housing members 10 are secured on a substantial base of the proper height to support the bowl 1 so that it may be tilted on the axis of the shaft members 3 and 4 to provide easy access to the interior of the bowl 1, shaft members 3 and 4, and paddles 5, 6 and 7, for cleaning and sterilizing, also for dumping the cheese from the mixer if desired, and it will be here noted that the shaft members 3 and 4 together with the paddles secured thereto, may be removed by turning the control wheels 11 in counter-clockwise direction which causes the portions 3a and 4a of shaft members 3 and 4 to move towards each other, thus relieving their interlocking relation, after which the shaft members 3 and 4 together with their paddle, may be easily removed for cleaning and sterilizing, leaving the bowl clear for cleaning and sterilizing purposes, after which the shafts may be placed back in position so that the tapered splined ends are positioned in the tapered splined portions of the spindles 14. The wheels 11 turned in clockwise direction the shafts will then be moved outwardly, causing interlocked relation of the shaft portion 3a and 4a as shown in Fig. 4 of the drawing.

With the bowl filled to proper height with the cheese, the power force operating chain 9, sprocket 8, turning the spindle 14, causing shaft members 3 and 4 carrying the paddles in mixing relation with the cheese so that the cheese is folded in layers by these angularly positioned paddles in close relation with the inner side of the bowl at all points permitting portions of the cheese to pass through the openings 5a, 6a and 7a, if the pressure becomes too high thus preventing the packing between the paddles, providing for the folding of the cheese in folded layers and thus preventing the breaking of the curds of the cheese. The cheese may be removed through the opening 2b at the center part of the lower side of the bowl 1, or the bowl 1 may be tilted for emptying purposes if desired.

Though I have shown and described a particular construction, combination, and arrangement of parts and portions, I do not wish to be limited to this particular construction, combination, and arrangement, but desire to include in the scope of my invention the construction, combination, and arrangement substantially as set forth in the appended claims.

Having thus described my invention, what I claim as new and desire to secure by Letters of Patent is:

1. In a cheese mixer of the class described, the combination of a U-shaped in cross-sectioned bowl with straight vertical ends, tiltably mounted on a horizontal axis and open at its upper side coextensive with its upper side, a shaft revolubly mounted axially with the pivotal axis of said bowl, a plurality of mixing paddles fixed on said shaft on an angle therewith extending to adjacent the curved portion of said bowl and curved at their ends to conform with the curved inner surface of said bowl, said paddles positioned with relation to each other on said shaft so as to substantially cover the space in said bowl from the horizontal axis of said shaft to the lower side of said bowl from end to end, said shaft being separable intermediate its ends in said bowl and provided with interlocking hooked like ends to permit the removal of said shaft and paddles from the bowl when shifted towards each other through said open upper side, means for interlocking said shaft sections at their separable ends and means for longitudinally shifting the separable portions of said shaft into interlocking relations and for disengaging the same.

2. In a cheese mixer of the class described, the combination of a U-shaped and cross-sectioned bowl with straight vertical ends, tiltably mounted on a horizontal axis and open at its upper side coextensive with its upper side, a shaft revolubly mounted axially with the pivotal axis of said bowl, a plurality of mixing paddles fixed on said shaft on an angle therewith extending to adjacent the curved portion of said bowl and curved at their ends to conform with the curved inner surface of said bowl, said paddles positioned with relation to each other on said shaft so as to substantially cover the space in said bowl from the horizontal axis of said shafts to the lower side of said bowl from end to end, said shaft being separable intermediate its ends in said bowl and provided with interlocking hooked like ends to permit the removal of said shaft and paddles from the bowl when shifted towards each other through said open upper side, means for interlocking said shaft sections at their separable ends, means for longitudinally shifting the separable portions of said shaft into interlocking relations and for disengaging the same and hand wheel means externally of said bowl engageable with the extended ends of the sections of said shaft engageable with the ends of said shafts for shifting said sections longitudinally.

References Cited in the file of this patent

UNITED STATES PATENTS

| | | |
|---|---|---|
| 130,473 | Broughton | Aug. 13, 1872 |
| 472,830 | Silen | Apr. 12, 1892 |
| 959,811 | Smith | May 31, 1910 |
| 1,433,959 | Le Petrie | Oct. 31, 1922 |
| 1,457,622 | Eliopulos | June 5, 1923 |
| 1,590,021 | Grace | June 22, 1926 |
| 1,706,417 | Simpson | Mar. 26, 1929 |
| 1,727,444 | Prescott et al. | Sept. 10, 1929 |